United States Patent Office 3,214,277
Patented Oct. 26, 1965

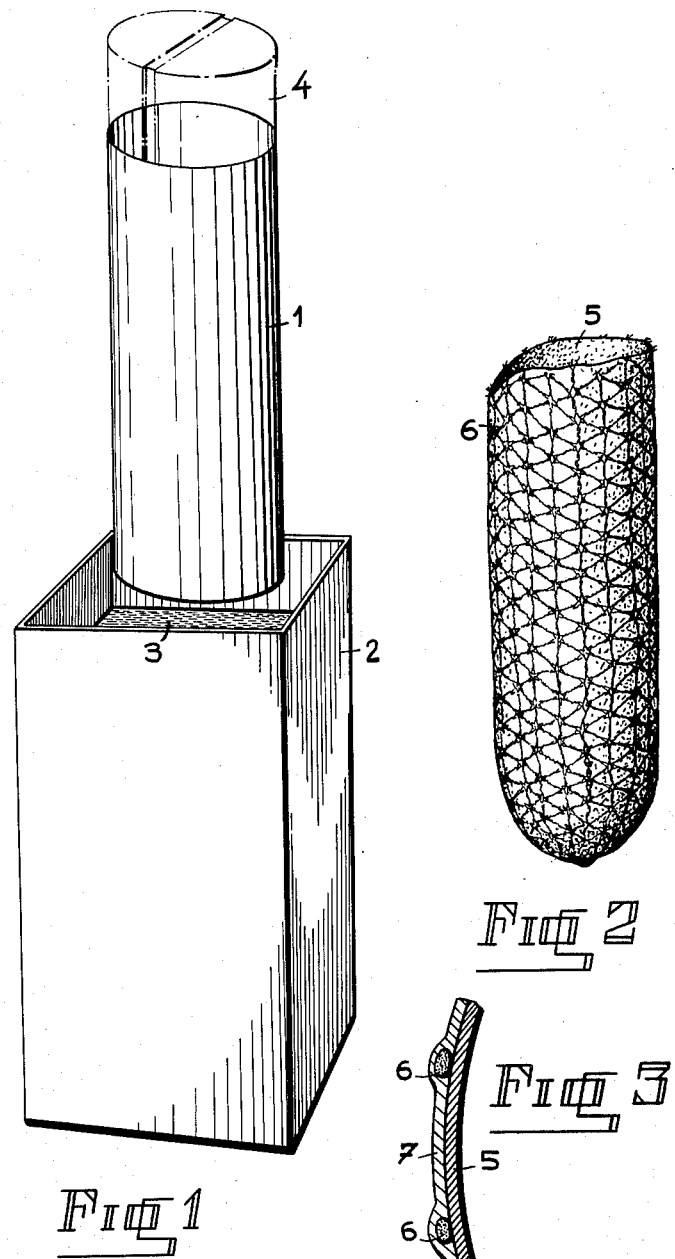
INVENTOR.
Hubert Jacob Vaessen

3,214,277
SAUSAGE CASINGS AND PROCESSES FOR MAKING SAME
Hubert J. Vaessen, Deventer, Netherlands, assignor to H. Vaessen N.V., Deventer, Netherlands
Filed July 12, 1963, Ser. No. 294,662
Claims priority, application Netherlands, July 20, 1962, 280,854
17 Claims. (Cl. 99—175)

This invention relates to novel and improved sausage casings and to processes for making same.

Intestines of pigs cannot be used in their natural state for the production of sausage casings. The small intestines are narrow and show many convolutions and although chitterlings have a sufficient width, they are weak and do not possess even walls.

Originally it has been proposed to make chitterlings suitable for the production of sausage casings by removing the skins and the layer of fat, stretching it, and strengthening the so further weakened product again by applying a fabric or a netting thereon and then bonding the intestine and the textile product together with a jelly-like material which has been preferably prepared from animal raw materials.

However, chitterlings not only contain a layer of fat, but also their tissues contain much fat. Because of this the sausage casings made therefrom do not have good keeping qualities, but soon become rancid and therefore unmarketable. The above mentioned products consequently have not found commercial acceptance.

Some years later a process for making sausage casings from natural intestines was developed which permitted to use thin intestines of pigs as starting material. According to this process intestines which have been defatted and made porous are stretched and cut open in longitudinal direction and the so obtained strips of intestine are laid in moist condition around a mandrel with an overlapping of their edges, whereby the intestines by their own adhesive power are stuck together at the places of the overlappings, after which the so formed sausage casing is dried and removed from the mandrel. This process has been carried out in practice on a large scale during the last twenty years.

Nevertheless this last mentioned process also shows some drawbacks. A sausage casing made from one single layer (thus on the seams two layers) has an insufficient strength for the manufacture of sausages. In practice this kind of sausage casing is always made of two layers (thus on the seams there are present three and sometimes four layers).

Actually, when the casing is stuffed with the sausage mass, it is put under pressure, which sometimes causes rather sharp variation in diameter, whilst furthermore nearly always some rupturing occurs, despite the fact that the casing is made of a plurality of intestine layers.

There are other objections against the double-layer product. In the first place the process is expensive both in labour and in raw materials and, in the second place, when the casings are manufactured from more than one layer, air bubbles are formed between the layers. These bubbles are considered a disadvantage by the users and moreover the casing is not very strong at these places.

An object of the invention is to provide a casing which does not show the disadvantages of the prior casings. Another object is to provide such a casing which consists substantially entirely of animal material. A further object is to provide a casing wherein a netting has been incorporated. A still further object is to provide composite casings the outer layers of which are formed by chitterlings. Still other objects are to provide processes for making these above mentioned improved sausage casings. Further objects and purposes will become apparent from the following description in connection with the accompanying drawing.

According to the invention these objects are accomplished by a sausage casing comprising an inner layer consisting of overlapping strips of animal intestines stuck together by their own adhesive force, and an outer layer consisting of a coating of a macromolecular material which is water-insoluble, but swellable in hot water. Preferably the macromolecular material of the coating is of animal origin. The coating may be colored with dyes and/or pigments in order to make it possible to distinguish different kinds of sausages. According to a special embodiment a netting is present between said inner layer and said outer layer, and according to another embodiment said coating in turn is surrounded by a natural animal intestine.

The process of making these novel casings includes the above mentioned steps of stretching, and cutting open longitudinally, intestines which have been defatted and made porous, and laying the so obtained strips of intestines around a mandrel with mutual overlappings of their edge portions, whereby said strips by their own adhesive force are stuck together at the places of the overlappings, and additionally the novel steps of applying a coating of a macromolecular material to the so formed single layer casing, and curing said coating to a state wherein it is water-insoluble, but swellable in hot water.

The coating treatment of this invention can be carried out either before or after the drying of the casing layer and in the latter case—which is preferred—it may be performed either after removing the single layer casing from the mandrel, or preferably whilst this single layer casing is still on the mandrel.

The present invention makes it possible to make a sausage casing from only one layer of small intestines of pigs (on the seams two or if necessary three layers), which casing thanks to the coating is strong enough for the manufacture of sausages and moreover shows much fewer and much smaller air bubbles.

Furthermore it is possible to carry out the application and the curing of a coating with mechanical expedients and consequently these steps are cheaper in labour than the application of a second intestine layer. Besides it is possisble to use for the coating cheaper materials than small intestines, particularly pig's intestines, which up to now had to be used for the second layer.

In principle one can of course use for the coating any macromolecular material, which by curing can be brought into a state wherein it is difficultly or not fusible, water-insoluble, but swellable in hot water, such as melamine resins, amylose, natural and synthetic rubber lattices, and in general any resin or polymer which may be cured to the B-stage (i.e. water-insouble, but water-swellable), provided the coating composition does not contain large amounts of formaldehyde, since this tends to make the layer of intestine strips unduly stiff. However, in practice one uses preferably proteinaceous materials of animal origin, which are obtained in a known manner, for instance from skins of pigs, cattle, etcetera. These materials are known per se and have not only been used for bonding chitterlings to a textile product, but also for producing sausage casings without any intestine, but, if desired, with a reinforcement of an open textile fabric. However one has never thought of the possibility to reinforce the casings made from strips of thin intestines with such materials. The application of these known materials for the present purpose has the advantage that one obtains a sausage casing which has been manufactured almost entirely from animal material, so that the natural properties required for several kinds of sausages are preserved. Also the appearance of the sausage casing of the invention, apart from the above mentioned improvement, shows no principal difference with that of the casings made from two or more layers of strips of intestines.

The preferred coating material can be prepared by digesting the animal raw material with either an acid or a base, mechanically comminuting the mass, adding a curing agent and, if desired, a plasticizer, and adjusting the temperature and the solids content of the mixture to the desired coating values. Such techniques are known per se and do not form part of the invention. The curing agent can be an aldehyde, such as formaldehyde, butyraldehyde, glutaric dialdehyde, or a substance from which an aldehyde can be liberated, such as hexamethylene-tetramine.

The process according to the invention makes it possible to control the strength of the sausage casings by simply adjusting the thickness of the coating layer. Of course the larger the diameter of the sausage casing is, the greater its strength should be. The application of the coating can be carried out in any suitable way, e.g. by dipping or brushing. The curing conditions depend of course on the nature of the coating mixture and the possible additions and are adapted to the desired elasticity and crispness of the end product When the above mentioned mixture based on animal material is used, the curing generally can be carried out during 1–4 hours at 40–90° C.

If required, one or more dyes and/or pigments can be added to the coating mixture. Thereby certain decorative effects can be obtained, whereas it furthermore is possible to distinguish several kinds of sausages by different colours.

Various kinds of sausages e.g. salami, after stuffing are wound with a string or covered with a net and finished in this condition. In this finishing process (a.o. the drying process), the sausage loses about 25–30% of its weight and thereby shrinks. The string or the net will then hang losely around the sausage, which results in a less acceptable appearance. Now it is of course possible to introduce a netting between both intestine layers, when working according to the above mentioned old commercial process, but of course the disadvantage of the forming of air bubbles will then occur to a much greater extent.

According to an embodiment of the present application a sausage casing is made from one intestine layer (except on the seams), a netting is applied around the casing and the so obtained unit is coated as described above. In this manner one obtains a sausage casing which, beyond the advantages mentioned already, still shows the following advantages: The diameter is more permanent and the casing is stronger than without a netting; the netting is enclosed inside the sausage casing and on drying thereof will remain attached to the intestine and thus will not hang loosely around it.

According to another embodiment a second sausage casing is applied around the coated intestine. This second casing in principle may exist of any desired material. One can use e.g. for liver sausage, large intestines of pigs, e.g. a chitterling. In this embodiment a coloured coating yields a particularly nice effect, since the exterior intestine itself also is more or less transparent. For liver sausage, a white coating can advantageously be chosen. However, this embodiment generally will only be carried out on a small scale in view of the bad keeping qualities of chitterlings In the drawing FIGURE 1 shows a practical way of carrying out the coating operation, FIG. 2 shows a casing according to one of the embodiments of the invention, and FIG. 3 shows a sectional view of this same casing on an enlarged scale.

In FIGURE 1 the coating operation is carried out simply by dipping a casing 1 made from one layer of intestine strips, the edge portions of these strips overlapping each other, into a tank 2, filled with the coating composition 3. The casing to be coated is still on the mandrel 4 on which it has been made. This mandrel is of the known type having a controllable diameter. Generally the diameter is kept at or near the maximum during the making of the layer of intestine strips and during the subsequent drying, coating and curing operations. The finished casing can then simply be removed from the mandrel by reducing the mandrel's diameter.

After the layer of intestine strips has been formed, the mandrel with the layer is preferably first brought into a drying room, where the single layer casing is dried for some hours at a temperature of from 40° to 90° C. Thereafter the product is coated, e.g. as shown in FIGURE 1 and then it is cured, preferably on the mandrel, for some hours at 40–90° C.

Referring now to FIGURES 2 and 3, the layer of intestine strips is indicated therein with the numeral 5 and the netting surrounding this layer with the numeral 6. The netting is bonded to the layer of intestine strips by a transparent coating (numeral 7 in FIG. 3), so that the netting remains in its place during the stuffing and the ageing of the sausage.

Although the invention has been described with reference to certain embodiments, those skilled in the art will readily appreciate that many modifications of these embodiments can be made within the scope of the invention.

I claim:

1. A sausage casing, comprising an inner layer consisting of overlapping strips of animal intestines stuck together by their own adhesive force, and an outer layer consisting of a coating of a macromolecular material which is water-insoluble, but swellable in hot water.

2. A sausage casing according to claim 1, wherein said coating consists of a proteinaceous material of animal origin.

3. A sausage casing according to claim 1, wherein said coating additionally contains at least one material chosen from the group of dyes and pigments, said material being compatible with said proteinaceous material of said coating.

4. A sausage casing, comprising an inner layer consisting of overlapping strips of animal intestines stuck together by their own adhesive force, an outer layer consisting of a coating of a macromolecular material, which is water-insoluble, but swellable in hot water, and a netting interposed between said inner layer and said outer layer.

5. A sausage casing according to claim 4, wherein said coating consists of a proteinaceous material of animal origin.

6. A sausage casing comprising an inner layer consisting of overlapping strips of animal intestines stuck together by their own adhesive force, a coating surrounding said inner layer, and consisting of a macromolecular material which is water-insoluble, but swellable in hot water, and an outer layer of a natural animal intestine surrounding said coating.

7. A sausage casing according to claim 6 wherein said coating surrounding said inner layer contains a coloring material.

8. A sausage casing according to claim 6, wherein said coating consists of a proteinaceous material of animal origin.

9. A process for making sausage casings, wherein a casing layer is formed from overlapping strips of animal intestines, which have been defatted and made porous and, due to their own adhesive force, are stuck together, comprising the further steps of applying to a so obtained single layer casing a coating of a macromolecular material, and curing said coating to a state wherein it is water-insoluble, but swellable in hot water.

10. The process of claim 9, wherein a coating is applied of a proteinaceous material of animal origin.

11. The process of claim 9, wherein said coating additionally contains at least one coloring material compatible with said material.

12. A process for making sausage casings, wherein a casing layer is formed from overlapping strips of animal intestines which have been defatted and made porous and, due to their own adhesive force, are stuck together, comprising the further steps of surrounding a so obtained single layer casing with a netting, applying a coating of a macromolecular material to said combination of casing and netting, and curing said coating to a state wherein it is water-insoluble, but swellable in hot water.

13. The process of claim 12, wherein a coating is applied of a proteinaceous material of animal origin.

14. A process for making sausage casings, wherein a casing layer is formed from overlapping strips of animal intestines which have been defatted and made porous and, due to their own adhesive force, are stuck together, comprising the further steps of applying to a so obtained single layer casing a coating of a macromolecular material, applying a natural animal intestine around said coating and curing said coating to a state wherein it is water-insoluble, but swellable in hot water.

15. The process of claim 14, wherein said coating additionally contains at least one coloring material compatible with said macromolecular material.

16. The process of claim 14, wherein a coating is applied of a proteinaceous material of animal origin.

17. A process for making sausage casings containing the steps of stretching intestines which have been defatted and made porous, cutting open said intestines longitudinally, laying the so obtained strips of intestines in moist condition around a mandrel with mutual overlappings of their edge portions, whereby the intestines by their own adhesive power are stuck together at the places of the overlappings, coating the so formed single layer casing with a proteinaceous material of animal origin by dipping said mandrel with said single layer casing in a liquid containing said material, curing said coating to a state wherein it is water insoluble, but swellable in hot water and removing the so obtained composite casing from said mandrel.

References Cited by the Examiner

UNITED STATES PATENTS

| 2,320,510 | 6/43 | Cornwell et al. | 99—175 |
| 2,428,495 | 10/47 | Lesparre et al. | 99—175 |
| 2,890,121 | 6/59 | Rinehart | 99—175 |
| 2,922,186 | 1/60 | Sartore | 17—45 |
| 2,977,233 | 3/61 | Vaessen | 99—175 |

FOREIGN PATENTS

| 62,435 | 2/49 | Netherlands. |

A. LOUIS MONACELL, *Primary Examiner.*